United States Patent Office 3,173,934
Patented Mar. 16, 1965

3,173,934
ORGANIC ALUMINUM COMPOUNDS
Brian K. Davison, Didsbury, Manchester, England, assignor to Hardman & Holden Limited, Manchester, England, a company of Great Britain
No Drawing. Filed Aug. 12, 1960, Ser. No. 49,137
Claims priority, application Great Britain, Aug. 19, 1959, 28,308/59
1 Claim. (Cl. 260—414)

This invention relates to organic aluminum compounds, and has for its object to provide organic aluminum compounds having rates of hydrolysis in acid solution, in water or in alkaline solution which are limited so as not to exceed desired values. The invention particularly further relates to methods of preparing such compounds.

The compounds according to the invention are obtained from polymeric aluminum compounds of the general formula $(O-Al-X)_n$, where X is an alkoxy group and $n$ is an integer, by reacting such compounds with water or at least one pharmacologically active substance containing a group with a reactive hydrogen atom, and with a substance yielding a group adapted to dominate the reactivity of the resultant compound with respect to hydrolytic agents.

The polymeric aluminum compounds of the formula $(O-Al-X)_n$ include compounds such as polyoxo-aluminum isopropoxide and polyoxo-aluminum butoxide.

The pharmacologically active substances contain one or more of the following groups: hydroxyl, carboxylic acids, phenolic, imido, sulphonic acid and ketoenolic groups.

Examples of such substances are: tribromo-ethanol, trichloro-tert-butanol, methyl pentynol, chloral hydrate, benzyl alcohol, 3-(2-methyl phenoxy)propane-1.2-diol, glycerol, ethanolamine, salicyclic acid and its esters, acetyl salicyclic acid, p-amino salicyclic acid, barbituric acid and its substitution products, saccharin, ascorbic acid, gluconic acid, glucose, sorbitol, sucrose, maltose, raffinose, lactose, and other oligosaccharides, and androgens, oestrogens, progesterones, corticosteroids, ephedrine, adrenaline, and sympathomimetic substances of the adrenaline type, penicillin, aureomycin, chloramphenicol, tetracycline hydrochloride, oxytetracycline hydrochloride, erthromycin, atropine and its analogues, thymol, hexylresorcinol, phenolphthalein, aloe-emodin, stilboestrol, bis-hydroxy coumarin, mandelic acid, benzoic acid, lactic acid, chaulmoogric acid, nicotinic acid, nicotinamide, phenacetin, acetanilide, and other substances of the constitution referred to which are described in the British Pharmaceutical Codex.

Substances which yield groups for controlling the rate of hydrolysis include substances which are fatty or waxy in nature, for example, oleic acid, stearic acid, oleyl alcohol, stearyl alcohol, cetostearyl alcohol, and castor oil, which impart some of their waxy or fatty characteristics to the molecule, so that hydrolysis is slowed down considerably or prevented dependent upon the amount of these materials present.

Controlled hydrolysis may be achieved also by the attachment of groups imparting limited solubility in aqueous solutions to the resultant aluminum compound, such as the benzoate group.

The compounds according to the invention may be obtained by reacting a polymeric aluminum compound first with a substance containing a hydrolysis-limiting group, and subsequently with water or a pharmacologically active substance, or by reacting a polymeric aluminum compound with a substance containing a hydrolysis-limiting group and with water or a pharmacologically active substance simultaneously.

An alternative method of preparation where the substances contain acidic groups is to mix an aluminum mono-soap of the pharmacologically active substance with an aluminum mono-soap of the substance containing the hydrolysis limiting group, and effect a condensation with elimination of water to give a polymeric aluminum compound.

Polymeric aluminum compounds which have any desired rate of hydrolysis, within limits, may be obtained by suitable choice of the hydrolysis-limiting group and of the relative proportions of the groups in the molecule.

The invention includes within its scope polymeric aluminum compounds of the formula $(O-Al-R)_n(O-Al-R_1)_m$, where R is a residue of a pharmacologically active substance containing at least one hydroxyl, carboxylic acid, phenolic, imido, sulphonic acid or keto-enolic group, $R_1$ is an oleate, stearate, benzoic, oleylate, stearylate, cetostearylate or castor oil fatty acid radical, and $n$ and $m$ are integers.

To illustrate the results obtainable according to the invention, the following figures which have been obtained for the hydrolysis of polyoxo-aluminum p-amino-salicylates by 0.07 N hydrochloric acid at 37° C. are given.

A polyoxo-aluminum p-amino-salicylate of the formula

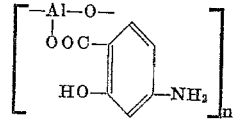

is hydrolysed almost immediately to the extent of 80–100% at 37° in 0.07 N hydrochloric acid. A similar compound where p-amino-salicylic acid and oleic acid are present in the molar ratio of 0.9 M p-amino-salicylic acid to 0.1 M oleic acid is 50 to 60% hydrolysed after two hours at 37° C. in 0.07 N hydrochloric acid, whilst a polyoxo-aluminum p-amino-salicylate-oleate in which the p-amino-salicylic acid and oleic acid are in equimolar proportions is hydrolysed approximately 10% after two hours.

In an alkaline medium of pH 8 of a polyoxo-aluminum p-amino-salicylate-oleate with a p-amino-salicylic acid to oleic acid ratio=1 is only 5% hydrolysed after two hours at 37° C. When the p-amino-salicylic acid/oleic acid ratio=3 the compound is 20% hydrolysed after two hours at 37° C. at this pH, and when the p-amino salicylic acid/oleic acid ratio=9, the compound is 80% hydrolysed after two hours.

When benzoic acid is present in the polyoxo-aluminum p-amino-salicylate compound, similar effects are obtained though the extent of hydrolysis differs. A compound containing equimolar proportions of p-amino salicylic acid and benzoic acid is 60–80% hydrolysed after two hours at 37° C. by 0.07 N hydrochloric acid.

A polyoxo-aluminum chloral hydrate of formula:

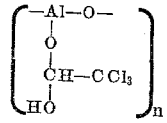

is 60% hydrolysed by .01 N hydrochloric acid in two hours at 37° C., whilst when benzoic acid is present in the compound in the ratio of 0.4 mole to 0.6 mole of chloral hydrate, the compound is only 35–40% hydrolysed by 0.01 N hydrochloric acid after 2 hours at 37° C.

The preparation of organic aluminum compounds according to the invention is illustrated by the following examples:

Example 1

Polyoxo-aluminum isopropoxide (25.5 gms.) is dissolved by warming in toluene (100 mls.) and heated to 100° C. Oleic acid (eq. wt. 278) (34.8 gms.) dissolved in toluene is added dropwise to the aluminum-containing solution and the liberated isopropyl alcohol distilled off. p-Amino-salicylic acid (19.1 gms.) dissolved in hot isopropyl alcohol is added slowly. Finally all the solvents are removed by distillation under reduced pressure to give a product, a golden brown solid weighing 62.0 gms. polyoxo-aluminum oleate p-aminosalicylate containing equimolar proportions of the oleate and p-amino-salicylate radicals.

Example 2

A warm solution of p-amino-salicylic acid (19.1 gms.) and benzoic acid (15.0 gms.) in isopropyl alcohol (500 mls.) is added to polyoxo-aluminum isopropoxide (25.5 gms.) dissolved in dry toluene (50 mls.). The aluminum solution is maintained at 100 to 110° C. by heating in an oil bath at 120–130° C. during the addition and isopropyl alcohol is concurrently distilled from the reaction mixture, finally all the solvents are removed by distillation under reduced pressure to give 45.0 gms. of a white powder, polyoxo-aluminum benzoate p-amino-salicylate, containing equimolar proportions of the benzoate and p-amino-salicylate radicals.

Example 3

Polyoxo-aluminum isopropoxide (15.7 gms.) is dissolved in dry toluene (240 mls.) and heated to below the boiling point of toluene 100–110° C. and oleyl alcohol (33.05 gms.) in toluene (30 mls.) added dropwise with stirring and the liberated isopropyl alcohol distilled off. Then ascorbic acid (5.42 gms.) in isopropyl alcohol (180 mls.) is added slowly with stirring and isopropyl alcohol distilled off from the reaction vessel. After removal of the isopropyl alcohol, the solvent is removed by distillation under reduced pressure and the product taken to constant weight (with a maximum heating temperature of 120° C.) to give 45.0 gms. of the product, polyoxo-aluminum oleylate ascorbate, containing the oleyl alcoholate radical and the ascorbate radical in the molar ratio of 0.8 to 0.2.

Example 4

Polyoxo-aluminum isopropoxide (51 gms.) is dissolved in toluene (200 mls.) and heated to 100° C. Oleic acid (eq. wt. 278) (7 gms.) dissolved in toluene (20 mls.) is added dropwise to the polyoxo-aluminum solution, and the liberated isopropanol distilled off. Water (8.5 gms.) in isopropyl alcohol (50 mls.) is then added slowly, and on completion of the addition the solvents are removed by distillation, or the product which precipitates out may be separated by filtration from the mother liquor. The product is then dried to constant weight, giving an off-white polyoxo-aluminum hydroxide-oleate (35 gms.). Oleic acid and water are in the ratio 0.05 M to 0.95 M.

Example 5

A solution of benzoic acid (11.7 gms.) and chloral hydrate (63.5 gms.) in isopropyl alcohol (200 mls.) is added to polyoxo-aluminum isopropoxide (49 gms.) dissolved in isopropyl alcohol (200 mls.) and heated under reflux. The precipitate is filtered off, washed with isopropyl alcohol (100 mls.) and dried at 50° C. to constant weight, giving a polyoxo-aluminum benzoate, chloral hydrate compound weighing 62 gms.

Example 6

Dihydroxy aluminum acetyl-salicylate (24 gms.) and dihydroxy aluminum stearate (35 gms.) are heated under reflux with xylene (200 mls.), in a system containing a Dean and Stark water separator. During the heating the water which is liberated is collected and separated (3.4 mls.).

After the water has been separated the solvent is removed by distillation under vacuum to give a polyoxo aluminum stearate-acetyl-salicylate (55.5 gms.), containing equimolar proportions of the stearate and acetyl-salicylate radicals.

Example 7

Prednisolone (0.922 gms.), dissolved by warming in freshly distilled dry butanol (50 mls.), and stearic acid (0.1 gm.), dissolved in 5 mls. butanol, are added simultaneously to polyoxo-aluminum butoxide (0.33 gm.) dissolved in butanol (10 mls.). The reaction solution turns milky and is warmed for five to ten minutes. The solvent and liberated butanol are then removed by evaporation under vacuum at as low a temperature as possible to leave polyoxo-aluminum prednisolone-stearate (1.1 gms.), containing the prednisolone and stearate radicals in the molar ratio of 8:1.

Example 8

Stearic acid (eq. wt. 284) (2.84 g.) dissolved in butanol (10 mls.) is added dropwise to a solution of polyoxo-aluminum butoxide (11.6 g.) in butanol. Ascorbic acid (15.8 g.) dissolved in butanol (600 mls.) is then added and the reaction mixture held at 50 to 60° C. for fifteen minutes, the solvents are then removed, either by filtration or by distillation under vacuum at as low a temperature as possible. The resulting polyoxo-aluminum stearate-ascorbate weighs 23.1 gms., and contains the stearate and ascorbate radicals in the molar ratio of 1:9.

What is claimed is:

A method of making polymeric organic aluminum compounds comprising heating a compound selected from the group consisting of polyoxo-aluminum isopropoxide and polyoxo-aluminum isobutoxide with a substance selected from the group consisting of acetylsalicylic acid and p-amino-salicylic acid and a substance selected from the group consisting of oleic acid, stearic acid, benzoic acid, oleyl alcohol, stearyl alcohol, cetostearyl alcohol and castor oil, and distilling off the alcohol formed.

References Cited in the file of this patent

UNITED STATES PATENTS

| | | |
|---|---|---|
| 2,744,074 | Theobald | May 1, 1956 |
| 2,768,138 | Hotten et al. | Oct. 23, 1956 |
| 2,835,685 | Rinse | May 20, 1958 |
| 2,913,468 | Rinse | Nov. 17, 1959 |
| 2,925,430 | Stedehouder et al. | Feb. 16, 1960 |
| 2,932,659 | Reuter et al. | Apr. 12, 1960 |
| 2,936,317 | Arnold et al. | May 10, 1960 |
| 2,948,743 | Rinse | Aug. 9, 1960 |
| 2,952,695 | Stedehouder et al. | Sept. 13, 1960 |
| 2,959,606 | Mitra et al. | Nov. 8, 1960 |